United States Patent
Steele et al.

(10) Patent No.: US 9,222,032 B2
(45) Date of Patent: Dec. 29, 2015

(54) COMPOSITION AND METHODS FOR IMPROVED FUEL PRODUCTION

(71) Applicant: Mississippi State University, Starkville, MS (US)

(72) Inventors: Philip H. Steele, Starkville, MS (US); Sathishkumar Tanneru, Starkville, MS (US); Sanjeev K. Gajjela, Andhra Pradesh (IN)

(73) Assignee: Mississippi State University, Mississippi State, MS (US)

( * ) Notice: Subject to any disclaimer, the term of this patent is extended or adjusted under 35 U.S.C. 154(b) by 114 days.

(21) Appl. No.: 13/875,159

(22) Filed: May 1, 2013

(65) Prior Publication Data

US 2013/0291431 A1 Nov. 7, 2013

Related U.S. Application Data

(60) Provisional application No. 61/640,985, filed on May 1, 2012.

(51) Int. Cl.
| | | |
|---|---|---|
| *C10L 1/18* | (2006.01) | |
| *C10G 3/00* | (2006.01) | |
| *C10G 65/12* | (2006.01) | |
| *C11C 3/00* | (2006.01) | |

(52) U.S. Cl.
CPC .. *C10G 3/50* (2013.01); *C10G 3/45* (2013.01); *C10G 3/47* (2013.01); *C10G 3/49* (2013.01); *C10G 65/12* (2013.01); *C11C 3/00* (2013.01); *C11C 3/003* (2013.01); *C11C 3/006* (2013.01); *C10G 2300/1011* (2013.01)

(58) Field of Classification Search
CPC .............. C10G 3/45; C10G 3/47; C10G 3/49; C10G 3/50; C10G 65/12; C10G 2300/1011; C11C 3/00; C11C 3/003; C11C 3/006; C11C 3/47

See application file for complete search history.

(56) References Cited

U.S. PATENT DOCUMENTS

| | | |
|---|---|---|
| 4,795,841 A | 1/1989 | Elliott et al. |
| 7,868,214 B2 | 1/2011 | Marker |
| 7,967,973 B2 | 6/2011 | Myllyoja et al. |

(Continued)

FOREIGN PATENT DOCUMENTS

| | | |
|---|---|---|
| EP | 2325281 | 5/2011 |
| EP | 2513252 | 10/2012 |

OTHER PUBLICATIONS

Elliott et al., "Catalytic hydroprocessing of fast pyrolysis bio-oil from pine sawdust," Energy and Fuels (2012) 26, 3891-96.

(Continued)

*Primary Examiner* — Cephia D Toomer
(74) *Attorney, Agent, or Firm* — Valauskas Corder LLC

(57) ABSTRACT

Certain embodiments of the present invention are configured to produce boiler and transportation fuels. A first phase of the method may include oxidation and/or hyper-acidification of bio-oil to produce an intermediate product. A second phase of the method may include catalytic deoxygenation, esterification, or olefination/esterification of the intermediate product under pressurized syngas. The composition of the resulting product—e.g., a boiler fuel—produced by these methods may be used directly or further upgraded to a transportation fuel. Certain embodiments of the present invention also include catalytic compositions configured for use in the method embodiments.

18 Claims, 5 Drawing Sheets

(56) References Cited

U.S. PATENT DOCUMENTS

| | | |
|---|---|---|
| 8,022,258 B2 | 9/2011 | Myllyoja et al. |
| 8,022,260 B2 | 9/2011 | O'Connor et al. |
| 8,168,840 B2 | 5/2012 | Brady et al. |
| 8,183,422 B2 | 5/2012 | Alegria et al. |
| 8,207,385 B2 | 6/2012 | O'Connor et al. |
| 8,278,492 B2 | 10/2012 | Myllyoja et al. |
| 8,329,969 B2 | 12/2012 | McCall et al. |
| 8,389,781 B2 | 3/2013 | Sandstede et al. |
| 8,410,321 B2 | 4/2013 | Holtzapple et al. |
| 2006/0161032 A1* | 7/2006 | Murzin et al. ............ 585/240 |
| 2011/0192072 A1 | 8/2011 | Steele et al. |

OTHER PUBLICATIONS

Wyman et al., "Coordinated development of leading biomass pretreatment technologies," Bioresource Technology 96 (2005) 1959-66.

Xu et al., "Bio-oil upgrading by means of ozone oxidation and esterification to remove water and to improve fuel characteristics," Energy and Fuels (2011) 25, 1798-1801.

Xu et al., "Liquefaction of corn distillers dried grains with solubles (DDGS) in hot-compressed phenol," BioResources (2008) 3, 2, 363-82.

* cited by examiner

COMPOSITION AND METHODS FOR IMPROVED FUEL PRODUCTION

CROSS-REFERENCE TO RELATED APPLICATION

This application claims the benefit of U.S. Provisional Application No. 61/640,985 filed May 1, 2012.

FEDERALLY SPONSORED RESEARCH STATEMENT

This invention was made with Government support under DE-FG36-06GO86025 awarded by the United States Department of Energy and 0221966 awarded by the National Institute of Food and Agriculture, NIFA. The U.S. Government has certain rights in the invention.

BACKGROUND OF THE INVENTION

One known process for producing bio-oil from biomass includes a method called fast pyrolysis. Fast pyrolysis includes heating the biomass at elevated temperatures—e.g., 400 to 550° C.—in the absence of oxygen or in low-oxygen environments. Bio-oil may also be produced by slow pyrolysis, liquefaction or other alternative method. Any biological material or coal can be pyrolyzed, liquefied, or treated by an alternative technology to produce bio-oil.

Regardless of the method utilized for its production, bio-oils share some similar characteristics. More specifically, bio-oil is a dark brown colored liquid with pungent phenolic odor; bio-oil chemical properties vary with material utilized for its production or the conditions under which it is produced. Untreated bio-oil can be used as a boiler fuel. It has environmental advantages when compared to fossil fuels because, when burned, bio-oil produces less pollution than fossil fuels, specifically, half the $NO_x$, negligible quantities $SO_x$ emissions (which contribute to acid rain), and it is $CO_2$ neutral.

However, there are still some disadvantages with using untreated bio-oils. For example, untreated bio-oil has significant water content, high acidity, immiscibility with petroleum products, viscosity increase over time, and a distinctive odor. In addition, when tested for use as an engine fuel, bio-oil caused engine damage in many types of engines. In light of the many disadvantages of using untreated bio-oil as a fuel, it has not been adopted for widespread commercial use.

Presently, bio-oil upgrading techniques include hydrodeoxygenation, catalytic pyrolysis, and steam reforming mainly to reduce the oxygen content present in the bio-oil. Hydrodeoxygenation and catalytic pyrolysis techniques require extensive capital cost, complicated equipment, and a high amount of hydrogen consumption. Hydrodeoxygenation has been limited by rapid catalyst coking and reactor clogging. It is well known that theoretical hydrocarbon yields from biomass or coal derived bio-oil are relatively low.

It is clear that there is a need to develop new bio-oil conversion technologies that are more cost effective, increase fuel yields, and produce more fungible fuels. To this end, embodiments of this invention include a bio-oil pretreatment procedure to increase the bio-oil carboxylic acid content. By this method, two pretreatment steps, 1) oxidation and 2) acid anhydride treatments, may be performed depending on the conversion method and fuel type desired. The oxidation or acid anhydride steps may be performed singly or both may be applied in any order. The oxidation step converts some functional groups contained in the bio-oil to their corresponding carboxylic acid derivatives. An aspect of the invention is the conversion of the aldehyde and ketone functional groups to carboxylic acids. It is the aldehyde and ketone functional groups that are responsible for much of the coking experienced during bio-oil deoxygenation.

The acid anhydride treatment converts bound-water present in the bio-oil or oxidized product to carboxylic acids. The product produced from the combined oxidative and acid anhydride treatment is termed hyper-acidified product in this application.

The oxidation pretreatment to increase carboxylic acids in the raw bio-oil provides a route to an oxidized product that may produce more than a single biofuel. The oxidized bio-oil has an acid value of 130 to 165 mg KOH/g (the acid value may be more or less than the 130 to 165 range depending on the oxidation method applied and its severity). This is much higher than the raw bio-oil acid value that may range from 85 to 95 mg KOH/g. The composition of the oxidized product also varies from raw bio-oil depending on the nature of the pretreatment.

The oxidized product may be utilized to produce three boiler fuel types and three fully deoxidized hydrocarbon mixtures. The first boiler fuel type may be produced by catalytic partial deoxygenation of the original oxidized product. An aspect of the invention is that presence of a high proportion of carboxylic acids allows the utilization of syngas as a deoxygenation gas. Without the high acidity of the oxidation and acid anhydride treatments the bio-oil turns to sludge in the presence of pressurized syngas. Thus, only the acid pretreatment allow syngas, with a low hydrogen content, to be utilized to reduce the amount of hydrogen consumed during deoxygenation.

The partial deoxygenations referenced in this application may be achieved in the presence of pressurized syngas or pressurized hydrogen. For application of pressurized hydrogen, the catalyst will be a suitable partial deoxygenation catalyst. For application of pressurized syngas the catalyst must be a suitable partial deoxygenation and water gas shift catalyst (WGS). The catalyst may be bi-functional for partial deoxygenation and WGS or may be a mixture of a deoxygenation and WGS catalyst. The second fuel type requires esterification with addition of alcohol. Again, partial deoxygenation and WGS may be performed in the presence of a suitable catalyst or mixture of catalysts selective to these reactions. The third boiler fuel requires that olefination/esterification be performed on the oxidized product by addition of alcohols and olefin. Both the esterification and olefination/esterification reactions are performed simultaneously with partial deoxygenation in the presence of pressurized syngas or pressurized hydrogen as previously described.

The production of the hyper-acidified product also allows for the production of three more boiler fuel types. These boiler fuels may, as described for the previous three fuel production embodiments, be converted to transportation fuel if full deoxygenation and blending to accepted petroleum fuel standards are achieved. The three boiler fuels produce by these methods may be utilized for heating or may be fully deoxygenated to hydrocarbon mixtures utilizing hydrogen or hydrogen with a percentage of CO added. The hydrocarbons are then distilled to their gasoline, aviation fuel or diesel petroleum equivalents followed by blending to a standard transportation fuel.

The syngas utilized for embodiments of the present invention may be produced by gasifying any material by any gasification method known in the art. The relative proportions of the gas types comprising the syngas may be in any proportion. For example coal syngas contains approximately 14.0% hydrogen, 27.0% carbon monoxide, 4.5% carbon dioxide, 0.6% oxygen, 3.0% methane, and 50.9% nitrogen. Syngas produced from biomass, by contrast, contains approximately 10.8% hydrogen, 24.0% carbon monoxide, 6.0% carbon dioxide, 0.4% oxygen, 3.0% methane and 48.6% nitrogen. The presence of nitrogen is not required as nitrogen transferred to the fuel product is no beneficial. Other gases, such as methane may be beneficial but is not important. Oxygen is not required. In certain embodiments, it is required, however, that a percentage of hydrogen be present in the syngas to deoxygenate the oxidized or hyper-acidified product. In addition, the production of additional hydrogen to allow syngas to produce hydrogen in situ requires the presence of a percentage of carbon monoxide to promote the water gas shift (WGS) reaction. The proportion of the hydrogen and carbon monoxide relative to each other may be in any ratio that is capable of performing the deoxygenation reaction. Alternatively, a synthetic syngas may be produced containing any proportion of the relevant percentages of hydrogen and carbon monoxide. As for syngas produced from coal or biomass other gases may be present if the deoxygenation reaction and WGS reactions are either improved or not blocked by their presence. When utilized, a second gas port on the hydrotreater may add a percentage of hydrogen or carbon monoxide if one of these gases is insufficient to perform the deoxygenation or WGS reaction. Other gases or mixed gases may be administered with either of these gases as long as they either improve or do not interfere with the deoxygenation or WGS reactions.

Production of drop-in fuels requires full deoxygenation step at a higher temperature than for the mild deoxygenation. The first-stage product from any one of the above described boiler fuels may be upgraded to a transportation fuel grade via full deoxygenation step with an appropriate full deoxygenating catalyst.

The fully deoxygenated product will produce a hydrocarbon mixture that must be distilled to component fuels equivalent to petroleum fuels (gasoline, aviation fuel and diesel) using the appropriate vapor distillation temperatures for the petroleum fuels. It is intended that these fuels will not be exact equivalents of the petroleum fuels but will be blended with petroleum fuels to meet the ASTM standard for each of the fuel types.

Additional procedures have been developed to process bio-oil. For example, one method to prevent bio-oil from polymerizing during what may be termed "mild hydrotreating" consists of utilizing a mild temperature regime in the range of 250 to 300° C. in the presence of hydrogen and a hydrotreating catalyst. Another similar process calls for a two-stage deoxygenation of bio-oil comprising a partial hydrodeoxygenation utilizing pressurized hydrogen followed by a full hydrocracking deoxygenation. In yet another known procedure, a hydrocracking of the bio-oil step follows a mild hydrotreating step in which low temperature is applied to accomplish partial hydrodeoxygenation. The hydrotreating step is performed on raw bio-oil in the presence of pressurized hydrogen. However, such procedures do not include catalytic deoxygenation of oxidized and/or hyper-acidified products from bio-oil oxidation and/or acid anhydride pretreatments, nor utilization of syngas to perform catalytic deoxygenation. Such procedures may produce products with limited yield and limited energy density.

Another known procedure may produce an alcoholysis product by reaction of one or more alcohols in a reactor at a temperature between 150 to 500° C. at pressures between 500 to 4000 psi. Following the alcoholysis step, the product may be hydrotreated at a temperature between 120 and 450° C. at pressures between 500 and 3500 psi. A high boiling point hydrocarbon solvent may be added following the alcoholysis step. Any excess hydrocarbon solvent is reclaimed and recycled as a portion of the high boiling point hydrocarbon solvent. However, such procedure does not include oxidized and acid anhydride acidification processes prior to their alcoholysis treatment. The known procedure also calls for hydrotreating following addition high boiling hydrocarbon solvents, and not esterification of the hyper-acidified product. Such procedures also may produce products with limited yield and limited energy density.

Another known procedure is configured to reduce coking during bio-oil hydrocracking. This procedure includes addition of a high boiling hydrocarbon derived from mineral crude oil. The petroleum derived mineral product must be added to the hydrodeoxygenated pyrolysis oil, produced with hydrogen under pressure, such that the oxygen content of the upgraded bio-oil is below 30%. Yet another known procedure includes adding high boiling hydrocarbon solvents to bio-oil upgrading steps to reduce coking during hydrotreating. The hydrocarbon solvent was added following an alcoholysis step catalyzed by application of hydrotreating. In such procedures, no hydrocracking is performed, and, accordingly, each procedure adds a high boiling point hydrocarbon to hydrotreated pyrolysis oil that has had oxygen removed by application of the hydrotreatment with hydrogen under pressure in the presence of a hydrotreating catalyst. In addition, such procedures do not include oxidized and acid anhydrideprocesses prior to hydrotreating step nor did they utilize syngas under pressure to achieve oxygen reduction via catalytic deoxygenation. In one case, the procedures also disclose hydrotreating prior to the addition of high boiling hydrocarbon solvents in order to insure low oxygen content, but do not disclose adding high boiling hydrocarbon both before and after a syngas catalytic deoxygenation step. Clearly, such procedures may produce products with limited yield and limited energy density.

An additional known procedure to produce diesel range hydrocarbons includes a starting material of a mixture of bio-oil C12-C16 fatty acids, C12-C16 fatty acid esters and C12-C16 triglycerides. The fat products can be obtained from plant oils and fats, animal fats and oils fish fats or oils fats obtained from gene manipulated plants, recycled fats of the food industry or mixtures of any or the above named fat sources. Raw untreated bio-oils are not a rich source of esters. This procedure does not disclose the production of oxidized and hyper-acidified products by oxidation and acid anhydride treatments of raw bio-oils prior to combining them with fats.

Clearly, there is a demand for a conversion method that is more cost effective, increases fuel yield, and produces more fungible fuels than currently available methods and compositions. The present invention satisfies this demand.

SUMMARY OF THE INVENTION

This invention provides a system, composition, and process for the production of both boiler and transportation fuels. One aspect of the invention is the oxidation and hyper-acidification processes that produce high-acidity products from bio-oil. The two processes, oxidation and hyper acidification (addition of acid anhydride) may be applied singly or together in any order. As specified above the bio-oil may be produced by any process such as fast pyrolysis or liquefaction technique. The feedstock from which the bio-oil is produced may be biomass, coal or any other material. The new high-acidity product produced from converting bio-oil by the method may have an acid value up to 300 mg KOH/g; the acid value may be more or less depending on the oxidation method applied and its severity. This high-acid product allows partial deoxygenation, esterification or olefination/esterification methods to each be applied to produce boiler fuels with different properties. The deoxygenation method produces a boiler fuel with a mixture of a high percentage hydrocarbons and a low percentage of phenols and esters. The esterification and the olefination/esterification methods produce a high percentage of esters and lower amounts of phenols and hydrocarbons. Production of transportation fuels may be performed by fully deoxygenating the boiler fuels to produce an upgraded fuels composed mostly of hydrocarbons. From these mixed hydrocarbons molecular weight fuels equivalent to gasoline, aviation fuel and diesel fuels can be distilled to petroleum equivalents that can be blended to ASTM standard drop-in fuels.

One gas utilized to achieve the first-stage mild deoxygenation and/or esterification and/or olefination is syngas. This utilization of syngas has not previously been utilized and as such is one aspect of the invention. The syngas can be produced by gasifying biomass and compressing the syngas to the high pressures that may be required for deoxygenation processes to be applied. The advantage of the utilization of syngas is that a high percentage of hydrogen is saved during the mild deoxygenation stage. For the full deoxygenation step 100% hydrogen may be utilized or a mixture of hydrogen and up to 50% of CO. The CO produces a water gas shift (WGS) reaction that produces hydrogen from the reaction of CO with water. The CO may be combined with hydrogen in a pressurized tank or it may be input via an additional reactor port at the same time that the pure hydrogen is added to the reactor. Hydrogen gas may also be utilized to deoxygenate the oxidized product or hyper-acidified product.

Petroleum hydrocarbons and/or high molecular weight fats may be added to any of the boiler fuels produced just prior to their hydrocracking. The presence of the petroleum hydrocarbons or fats reduces catalyst coking and prolongs catalyst life. The added fats will increase yield and produce longer-chain molecules with more chance of production of branched hydrocarbons suitable for diesel and aviation fuel.

DETAILED DESCRIPTION OF THE INVENTION

Figure 1:
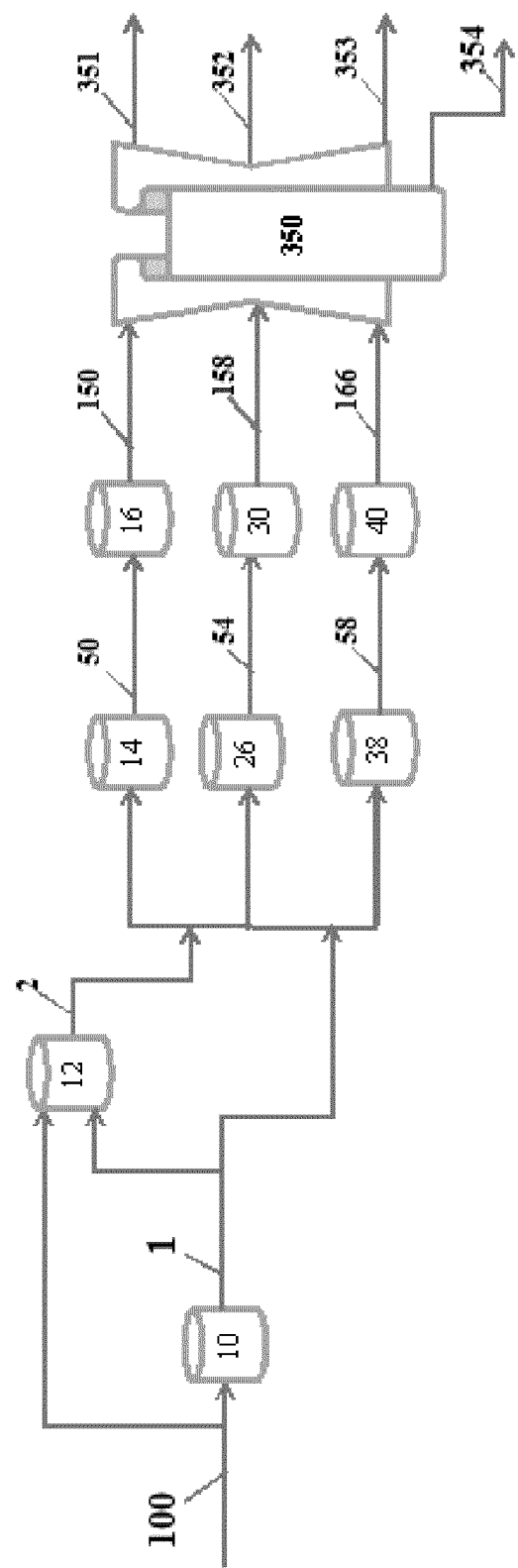
FIG. 1 shows a process flow scheme for several embodiments of the invention where bio-oil is converted to an oxidized or hyper-acidified product prior to conversion to hydrocarbons.

FIG. 1 depicts processes of this invention pertaining to the conversion of raw bio-oils 100 produced by any method and from any feedstock. The carboxylic acids present in bio-oils typically include formic acid, acetic acid, propionic acid and low molecular weight unsaturated organic acids. Among them, formic and acetic acids account for 80% of the total acid present. Certain embodiments of this invention include a high acidification pretreatment pathway that utilizes an oxidizing step or hyper acidification or both processes in any order 10, 12. The oxidation step applies a strong oxidizing agent to convert the low molecular weight compounds to their corresponding carboxylic forms. This oxidizing pretreatment step 10 converts all oxygenated functional groups, including aldehydes and ketones, to their corresponding carboxylic acid groups. The acid anhydride step 12 converts bound-water present in either bio-oil or oxidized product into carboxylic acids.

One method known in the art utilized ozone oxidation of rice husk bio-oil over 10 h to increase the acid value from 45.4 to 118.4 mg KOH/g. The inventors of that method added butanol to the high-acid bio-oil to cause an esterification reaction. A two-phase product was produced with the aqueous fraction poured off to give an oil-phase product with water reduced from 45% to 1-2%. The high-water content raw bio-oil had an HHV of 9.5 due to the high percentage of water it contained. Following esterification the HHV of the oil-phase was 25.0 MJ/kg. While this inventor of this rice husk bio-oil method applied a pretreating method that greatly increased the acid value of the raw bio-oil, their treatment was not followed by partial or full deoxygenation to produce a boiler fuel and a subsequent hydrocarbon mixture.

Figure 2:
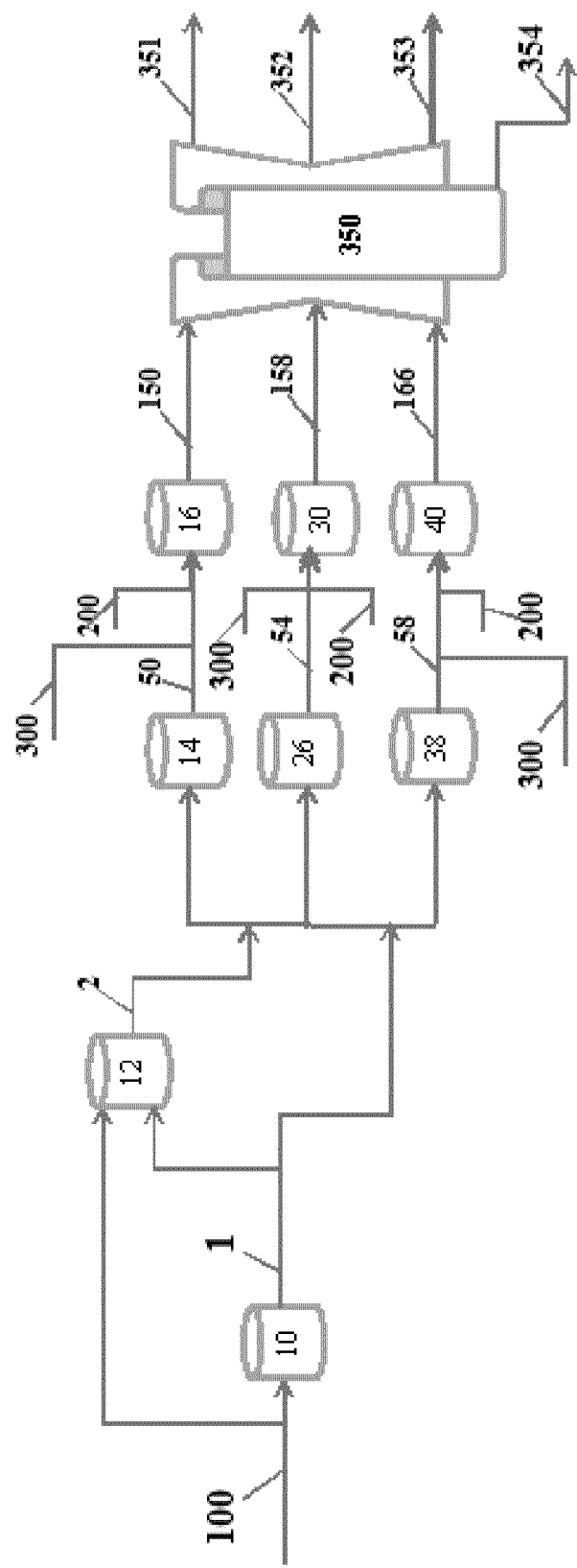
FIG. 2 shows a process flow scheme for several embodiments of the invention in which petroleum hydrocarbons and/or fats are added to boiler fuels prior to their full deoxygenation.
Figure 3:
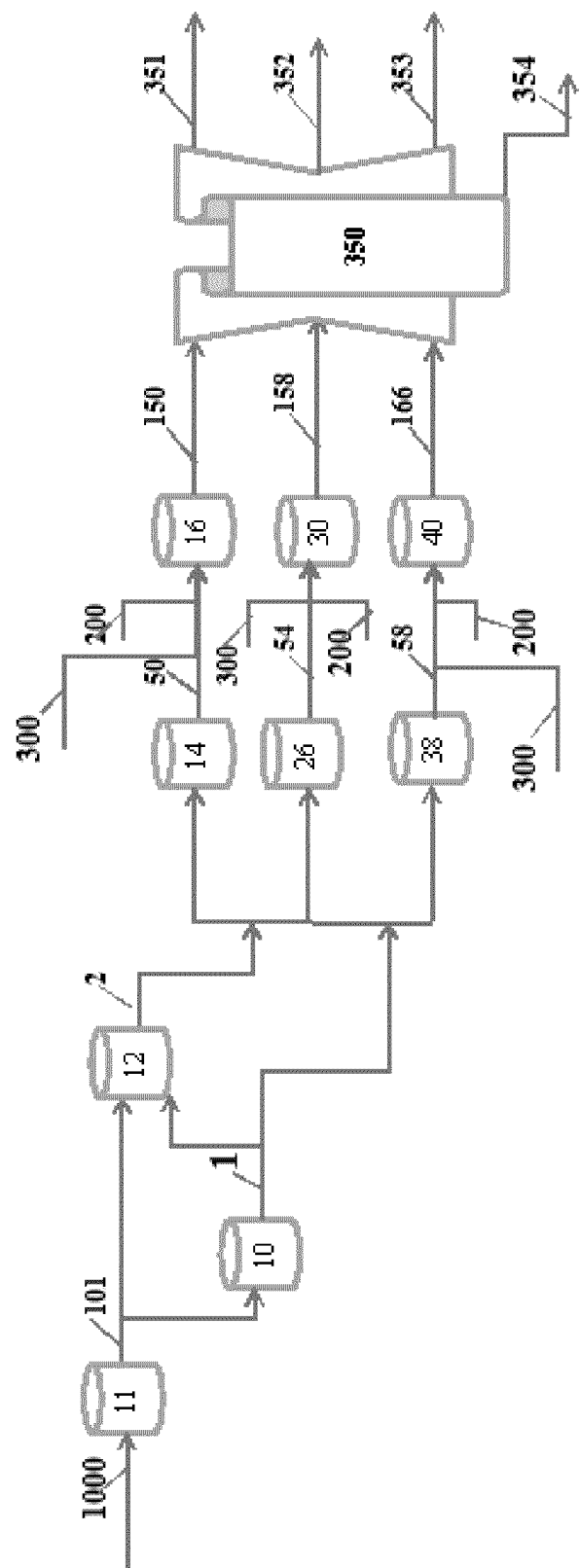
FIG. 3 shows a process flow scheme for several embodiments of the invention based on a first step of liquefying biomass or coal.

Each embodiment of this invention may include an oxidation step 10 (the oxidation step and its product are referenced in each of the three figures, FIG. 1, FIG. 2 and FIG. 3, depicting the process flows of embodiments of the invention) utilizing a strong oxidizing agent catalyzed by an oxidizing catalyst. This oxidation step 10 increases the bio-oil acid value from approximately 85 to 95 mg KOH/g to 130 to 165 mg KOH/g. Certain embodiments of methods of the invention require this oxidized product 1 as one intermediate to produce multiple boiler fuels and mixed hydrocarbons suitable as transportation fuels.

In certain alternative embodiments, following oxidation is catalytic deoxygenation 14 with pressurized (500 to 2000 psi) syngas at a temperature of 200 to 400° C. the present invention utilizes pressurized hydrogen at this catalytic deoxygenation step 14 at the same temperature and pressure. This single catalytic deoxygenation step 14 produces a percentage of hydrocarbons that result in the increase of HHV to 34-36 MJ/kg such that this intermediate could be utilized as a boiler fuel 50. Syngas has not previously been utilized as a deoxygenation gas making this one novel aspect of the present invention. The boiler fuel 50 produced from either pressurized gas (syngas or hydrogen) can be utilized as is or further processed into a mixed hydrocarbons 150 by a hydrocracking step 16 performed in the presence of hydrogen gas at 500 to 2500 psi at a reaction temperature of 300 to 500° C.

Syngas, as referenced for the purposes of the present invention, may be gas produced from any type of gasifier from biomass, coal or any other material. The syngas may be a synthetic syngas produced by combination of hydrogen, carbon monoxide or carbon dioxide, methane or any other gas type intended to render the total gas suitable as a synthetic syngas. The syngas obtained from biomass or as a synthetic syngas may be supplemented with carbon monoxide, hydrogen or methane by adding the separate gases under pressure or by introducing the supplemental gases through one or more additional ports on the reactor employed to deoxygenate or perform esterification or olefination/esterification of the oxidized product produced from bio-oil by oxidation as described in this application. Usually, the syngas, regardless of type, must be compressed to high pressure in a suitable tank with a high-pressure regulator. This allows it to be used as a pressurized gas on any catalytic reactor type that can apply pressurized gas to an oxygenated liquid.

Another known method is configured to prevent bio-oil from polymerizing during what is termed "mild hydrotreating" which consists of utilizing a mild temperature regime in the range of 250 to 300° C. in the presence of hydrogen and a hydrotreating catalyst. The hydrogen pressure level or time of reaction was not specified in the disclosure of the known method. The mild-hydrotreating method did not include catalytic deoxygenation of oxidized product and hyper-acidified product from bio-oil oxidation and acid anhydride pretreatment, respectively. The known method also did not include utilization of syngas to perform catalytic deoxygenation but described only mild hydrotreating with hydrogen gas to partially deoxygenate raw bio-oil. The known method did not include applying the method to liquefied bio-oil of any type.

A two-stage deoxygenation of bio-oil comprising partial hydrodeoxygenation utilizing pressurized hydrogen followed by full hydrocracking deoxygenation utilizing 100% hydrogen is another known method. The known methods do not utilize production of oxidized and hyper-acidified products from raw bio-oil. Also, the known methods do not disclose utilization of syngas to apply catalytic deoxygenation to partially remove oxygen. The known method is applied specifically to the treatment of pyrolysis bio-oil and did not mention its application to bio-oil produced from liquefaction.

A second embodiment of the invention follows the oxidation step 10. Specifically, the ultimate production of mixed hydrocarbon fuels are utilized in each step. For this second embodiment, reduction of the high acid value of the oxidized product 1 by step 10 is performed via a catalyzed esterification reaction that is produced simultaneously during a partial deoxygenation step 26. The esterification reaction requires the addition of 10 wt % or more of alcohol of any type or a mixed alcohol containing individual alcohols in any ratio. The reaction is by an esterification performed simultaneously with the partial deoxygenation step 26 in the presence of syngas or hydrogen at 100 to 1500 psi and at a reaction temperature of 200 to 400° C. The product of this reaction is a boiler fuel 54 with an HHV of 34 MJ/kg. The boiler fuel 54 can be utilized directly as a heating fuel or the product can be or further processed into a transportation fuel 158 by application of a full deoxygenation step 30 in the presence of pressurized hydrogen or hydrogen with up to 50% CO gas at 500 to 2500 psi at a reaction temperature of 300 to 500° C. Catalysts utilized for the partial deoxygenation step 26 performed simultaneously with the esterification process and the full deoxygenation steps 30 are as described below.

Yet another known method in the art produces an alcoholysis product by reaction of one or more alcohols in a reactor at a temperature between 150 to 500° C. at pressures between 500 to 4000 psi. Following the alcoholysis step the product was hydrotreated at a temperature between 120 and 450° C. at pressures between 500 and 3500 psi. The known method includes adding a high boiling point hydrocarbon solvent following the alcoholysis step. Any excess hydrocarbon solvent is reclaimed and recycled as a portion of the high boiling point hydrocarbon solvent. Such method does not disclose oxidation or hyper-acidification process prior to the alcoholysis treatment. The known method included also hydrotreating following addition high boiling hydrocarbon solvents. In contrast, embodiments of the present invention utilize esterification of the acidified product. This esterification takes place in the presence of pressurized syngas at a reaction temperature; both syngas pressure and reaction temperature applied by the process are defined above.

A third embodiment of the invention is the adding to the oxidized product 10 a number of other substances, such as, alcohol at 10 wt % or higher and liquid or gaseous olefins at 10 wt % or more. The alcohols and olefins may be of any single type or they may be combined in any ratio to produce a mixed alcohol or mixed olefins. The olefins may be a petroleum refinery product or produced from biomass by any other method. This combination is reacted simultaneously during the partial deoxygenation step utilizing the heat and pressure of this step. The partial deoxygenation reaction performed with the esterification/olefination reaction step 38 is performed in the presence of pressurized syngas or hydrogen (100 to 1000 psi) at a temperature of 200 to 350° C. Again, in this case an olefinated/esterified boiler fuel 58 is produced. Because this boiler fuel 58 has an HHV of 34-38 MJ/kg and, as for the previous boiler fuels, it may be utilized directly as a heating fuel or subjected to a full deoxygenation step 40 in the presence of pressurized hydrogen or the hydrogen with up to 50% CO may be utilized to take advantage of the WGS reaction. Catalysts utilized for the partial deoxygenation step 38 performed simultaneously with the esterification process and the full deoxygenation step 40 is as described below.

Another conventional method includes utilizing liquid or gaseous olefins with alcohols to produce a high-energy boiler fuel. The process of the current invention differs from that of the known method, because the process that is the subject of the present invention begins by production of the acidified products produced by either oxidation 1 or acid anhydride treatment 2.

This conventional method also produces an esterification/olefination product by either heating a combination of bio-oil with alcohol and a liquid olefin or they utilize a heterogeneous catalyst to produce the esterification/olefination product. However, the conventional method did not utilize the acidified product of the current invention. Nor did the conventional method utilize syngas to perform the olefination/esterification reaction.

The hyper-acidified product 2 is a lower water, more highly acidified, product than the previously described oxidized product 1. It is produced by adding up 20% of acid anhydride to raw bio-oil 100 or to the oxidized product 1. The methods for processing the hyper-acidified product 2 are identical to that for the oxidized product 1. That is, three boiler fuel types 50, 54, 58 are produced by a partial deoxygenation step 14, a simultaneous esterification partial deoxygenation step 26 or a simultaneous esterification/olefination partial deoxygenation step 38. These three steps may be performed in the presence of pressurized syngas or pressurized hydrogen. The reaction temperatures, gas pressures and catalysts applied may be all identical to those for the oxidized product 1 as previously described. Similarly, the acidified products produced by adding acid anhydride to raw bio-oil or adding acid anhydride to the oxidized product 1 employ identical and previously described partial deoxygenation step 14, simultaneous esterification partial deoxygenation step 26 or simultaneous esterification/olefination partial deoxygenation step 38 to produce three boiler fuels 50, 54, 58 for each. Again, the three steps 14, 26, 38 for each may be performed in the presence of pressurized syngas or pressurized hydrogen and the gas pressures, reaction temperatures and catalysts applied are identical. Following production of the three boiler fuels 50, 54, 58 for each of the two types of hyper-acidified products (acid anhydride added to bio-oil and acid anhydride added to the oxidized product 1), the boiler fuels 50, 54, 58 can be combusted for heating or can be converted to mixed hydrocarbons suitable for transportation fuels by full deoxygenation steps 16, 30, 40.

The three embodiments produce transportation fuels 150, 158, 166 from the three boiler fuels 50, 54, 58 initially produced may require that full deoxygenation steps 16, 30, 40 be employed to produce hydrocarbons. One of the above described known methods describe a hydrocracking step to follow a mild hydrotreating step in which low temperature is applied to accomplish partial hydrodeoxygenation. This hydrotreating step, as the terminology implies, is performed on raw bio-oil in the presence of pressurized hydrogen. However, the current invention differs markedly in the steps preceding the hydrocracking step described by the known method.

The first embodiment of the present invention may depend on oxidation of raw bio-oil by addition of a strong oxidizing agent of any type or mixture of types. The second embodiment utilizes acid anhydride added to the raw bio-oil to produce a highly acidified product with lower water content. The third embodiment of the invention includes utilizing the addition of acid anhydride the already oxidized product produced by addition of strong oxidants. The final two products are referred to as hyper-acidified products as the acid value is very high and water content is substantially lowered. The range of acid value increase is from 50 to 300 mg KOH/g depending on the severity of each acidification embodiment. The oxidized product 1 and hyper-acidified product 2 both differ substantially from the pyrolysis oil on which the partial and full deoxygenation steps defined by the McCall et al. (2012) patent are performed. The oxidation and hyper acidification steps 10, 12 convert aldehydes and ketones to carboxylic acids in the case of oxidation and, in the case of direct addition of acid anhydride to bio-oil water is converted. The oxidation step 10 followed by the acid anhydride treatment 12 both converts aldehydes and ketones to carboxylic acids but, depending on the wt % of addition of acid anhydride, can adjust the water content to a very low value of 5%, or lower. If the syngas is to be utilized as a partial deoxygenation gas, the WGS reaction depends on presence of water such that the amount of acid anhydride may require adjustment to leave the amount required for the specific reaction planned. The advantage of the oxidation step performed with strong oxidizing agents is that much of the coking that occurs during both partial and full deoxygenation steps are caused by the presence of the aldehydes. The oxidative conversion of the aldehydes and ketones to carboxylic acids assists in the reduction of coking and premature deactivation of the deoxygenation catalysts of both partial and full type. In addition reduction of water content by the acid-anhydride 12 treatments of the invention will also increase catalyst life during partial 14, 26, 38 or full 16, 30, 40 deoxygenations. Further, without the acidification produced by oxidation or hyper-acidification pressurized syngas cannot be utilized as the partial deoxygenation gas. If pressurized syngas is utilized as the partial deoxygenation gas without oxidation or hyper-acidification of the raw bio-oil the charring produced by aldehydes and ketones produces thick slurry that cannot be utilized as a boiler fuel or converted to a hydrocarbon mixture by full deoxygenation. Therefore, all of the embodiments improve on the known method in that the oxidized 1 and hyper-acidified 2 products allow lower consumption of hydrogen by utilization of any form of pressurized syngas; and premature deactivation of the hydroprocessing catalysts is reduced. The known process does not utilize production of oxidized or hyper-acidified product from raw bio-oil. Utilization of syngas to apply catalytic deoxygenation to partially remove oxygen is also not mentioned.

In another embodiment of the invention, by a process depicted in FIG. 3, a two- or 3-stage method is used to produce hydrocarbons suitable for transportation range fuels from biomass 1000 feedstock by first performing a liquefaction step 11 to liquefy the biomass 1000 at a temperature in the range of 200 to 450° C. The treatment to produce the liquefied product 101 may be performed with or without gas pressure. Following the liquefaction step 101 a partial deoxygenation step may be 14 performed at a temperature of 200 to 500° C. with pressurized hydrogen of 100 to 2500 psi. At this stage the product is a very high HHV (>40 MJ/kg). As for the other boiler fuels of the invention 50, 54, 58 a full deoxygenation step 16, 30, 40 may be required to reduce water, oxygen and, in this case, nitrogen.

Yet another known method provides utilizes liquefaction of biomass to produce renewable fuels. The researcher of that method identifies considerable research aimed at direct liquefaction of biomass utilizing either water or organic solvents including alcohols. Other methods describe hydrothermally liquefying biomass and bitumen coal in hot pressurized water and claim the conversion produces a hydrocarbon based fuel, but not hydroprocessing of the product to increase its quality.

A further embodiment of the invention includes adding an acid anhydride (this step and the product of this step is referenced in all figures) of 5 to 20% treatment simultaneously with the oxidizing treatment 10. Or, the acid anhydride can be added following oxidation step 10 to produce the same reaction. The acid anhydride converts most of the bio-oil water (bound-water) content to its corresponding carboxylic acid group. The oxidized product 1 treated with the acid anhydride by an acid anhydride treatment 12, will be referred to as the hyper-acidified product 2 for the purposes of this application. The hyper-acidified product 2 can be utilized by performing the steps 14, 26, 38 identical to the previous embodiments to produce three additional boiler fuels 50, 54, 58 or to fully deoxygenate of these additional three boiler fuels 50, 54, 58 by performing the steps 16, 30, 40 identical to the previous embodiments to transportation fuels 150, 158, 166. These additional three boiler fuels 50, 54, 58 and their additional three potential transportation fuels 150, 158, 166 produced from the hyper-acidified product 2 may have a higher yield and energy content due to the additional carboxylic acids present compared to that produced by oxidation alone.

FIG. 2 also depicts processes of the invention comprising the potential addition of a percentage of a petroleum hydrocarbon product 200 of low volatility (C11, or higher) to each of the boiler fuels 50, 54, 58 produced by the described embodiments. These petroleum hydrocarbon products 200 will be added in a percentage greater than 5% but below 50% to the boiler fuels 50, 54, 58 prior to full deoxygenation steps 16, 30, 40 to produce transportation range hydrocarbons 150, 158, 166 and will assist in the reduction of coking, and extending catalyst life, during the catalytic full deoxygenation stages.

Partial catalytic deoxygenation steps 14, 26, 38 and full deoxygenation steps 16, 30, 40 of the oxidized product 1 require application of deoxygenating catalysts. The partial deoxygenation catalyst usually differs from the full deoxygenation catalyst. Both types of catalyst may be developed from nickel (Ni), chromium (Cr), molybdenum (Mo), copper (Cu), iron (Fe), zinc (Zn), tungsten (W), barium (Ba), cobalt (Co), rhodium (Rh), potassium (K), iridium (Ir), cerium (Ce), vanadium (V), niobium (Nb), manganese (Mn), titanium (Ti), rhodium (Rh), ruthenium (Ru), rhenium (Re), platinum (Pt), palladium (Pd), potassium carbonate ($K_2CO_3$), sodium carbonate ($Na_2CO_3$), nickel carbonate ($NiCO_3$), any metal carbonates, zinc oxide (ZnO), magnesium (MgO), copper(II) oxide (CuO), copper(I)oxide $Cu_2O$, calcium oxide (CaO), nickel oxide (NiO), $Mo_2O_3$, $Ce_2O_3$, NiMo, CoMo, CuO/

$Al_2O_3$, $Pt/Al_2O_3$, $Pd/C$, $Rh/Al2O3$, NiCuK, NiFeK, NiWK, Fe2O3, any metal oxide, any metal carbides, any metal sulfides, any metal phosphides, $Ni_2P$, $Mo_2S$, NiMoK, CoMoK, sulfide cobalt molybdenum, sulfide nickel molybdenum, alumina ($Al_2O_3$), silica ($Si_2O$), silica-alumina ($Si_2O$—$Al_2O_3$), titania ($TiO_2$), activated carbon (C), ceria ($CeO_2$), aluminum silicates ($Al_2(SiO_3)_3$), hydrotalcite, any type of molecular sieves, zirconia ($ZrO_2$), HZSM-5 and all types of zeolites, any catalyst support materials, $Na(OH)_2$, KOH, $Mg(OH)_2$, $Ca(OH)_2$, metal hydroxides, one or more metals supported on any catalyst supports and combined with metal oxides and metal carbonates, or any combination thereof.

Conventional procedures include a method to reduce coking during bio-oil hydrocracking. This conventional procedure comprises addition of a high boiling hydrocarbon derived from mineral crude oil. The inventor of the conventional procedure state that the petroleum derived mineral product must be added to the first stage hydrodeoxygenated (partial hydrotreating with hydrogen) pyrolysis oil, produced with hydrogen under pressure, such that the oxygen content of the upgraded bio-oil is below 30%. The present invention differs from the conventional procedure in that the present invention does not hydrodeoxygenate (apply hydrogen gas under pressure) to pyrolysis oil but, rather, applies deoxygenation of an oxidized product 1 by catalytic deoxygenation 14 with syngas. Also, as previously discussed, the oxidized or hyper-acidified products are no longer a bio-oil but rather their chemical composition of the original bio-oil that has been altered. The propensity of bio-oil has been altered in the oxidized 1 and hyper-acidified 2 products such that charring is already reduced by the conversion of aldehydes and ketones to carboxylic acids. Reduction of water content by one of the two methods of hyper-acidification also lengthens catalyst life. Therefore, the present invention provides an improvement on the conventional procedure and permits converting bio-oil to a chemical mixture more amenable to prolonging catalyst life.

Yet another known method teaches adding high boiling hydrocarbon solvents during bio-oil upgrading to reduce coking during hydrotreating. The hydrocarbon solvent was added following an alcoholysis step catalyzed by application of hydrotreating. No hydrocracking step was performed. This method, along with other known methods, add a high boiling point hydrocarbon to hydrotreated pyrolysis oil that has had oxygen removed by application of hydrotreatment with hydrogen under pressure in the presence of a hydrotreating catalyst. The inventors of those methods did not perform the oxidation treatments to produce an oxidized or hyper-acidified prior to their hydrotreating step nor did they utilize syngas under pressure to achieve oxygen reduction via catalytic deoxygenation in which a WGS reaction occurs to produce additional hydrogen while lowering water content.

FIG. 2 depicts the details of processes of the invention comprising the potential addition of a percentage of high molecular weight fats 300 to each of the previous embodiments. These fats 300 will be added to the boiler fuels 50, 54, 58 produced by this invention in a percentage greater than 5% but below 50%. The benefit of this addition is an increase in yield above that promised by bio-oil alone and a shift in the product range toward more branched hydrocarbons such as diesel and aviation fuels. The boiler fuels 50, 54, 58 with added fats 300 will be catalytically fully deoxygenated by 16, 30, 40 steps at a pressure in the range of 500 to 2500 psi at a reaction temperature of 300 to 500° C. to produce transportation range hydrocarbons 150, 158, 166. Catalysts for the deoxygenation steps 14, 26, 38 and full deoxygenation steps 16, 30, 40 are as described above. A description of the full deoxygenation methods 16, 30, 40 is given above and the same method will be applied under identical conditions. Either 100% hydrogen or hydrogen with up to 50% CO will be utilized depending on the nature of the intermediate (basically water content must be sufficient to produce hydrogen in the presence of CO and water reacted with a WGS catalyst).

Still another method is known to produce diesel range hydrocarbons from a mixture of bio-oil and C12-C16 fatty acids and/or C12-C16 fatty acid esters and/or C12-C16 triglycerides. The fat products can be obtained from plant oils and fats, animal fats and oils, fish fats or oils and fats obtained from gene manipulated plants, recycled fats of the food industry or mixtures of any or the above named fat sources or any other oil or fat sources. Raw untreated bio-oils are not a rich source of esters. However, by pretreating bio-oil as described by the present inventors to a high acid bio-oil followed by addition of alcohol to perform esterification, numerous esters are formed. This ester-rich product will improve the yield of the higher molecular weight fuel types such as diesel and aviation fuel when mixed with the fats described above. As described above, this known method does not include the production of oxidized product by oxidation treatment of raw bio-oils prior to combining them with fats.

A final embodiment of the invention utilizes hydrogen for the partial and full deoxygenation steps 14, 26, 38, 16, 30, 40 that may be required for production of mixed hydrocarbons. The oxidized 1 and hyper-acidified 2 products are novel improvements on raw bio-oil as a feedstock for both partial and full deoxygenation steps 14, 26, 38, 16, 30, 40 in the presence of pressurized hydrogen. Therefore, the known methods that do not address oxidized and hyperacidified products are not relevant to the hydroprocessing of the new products. The inferiority of raw bio-oil as a feedstock for hydrotreating is evident in the problems with catalyst deactivation experienced by researchers in the field. The previous record for hydrotreating without complete reactor plugging halting the process has been about 100 h.

Yet another known method utilized numerous catalysts with various reaction conditions to perform subsequent partial deoxygenation and full deoxygenation, respectively, in separate heat zones in the same hydrotreater. The known methods teaches that 100 h was the maximum time on stream possible to attain prior to complete hydrotreater plugging with char.

By the present invention, both the oxidized 1 and hyper-acidified 2 products reduce coking during deoxygenation which includes partial deoxygenation steps 14, 26, 38 (partial deoxygenation in the presence of syngas or hydrogen) and full deoxygenation steps 16, 30, 40 (full deoxygenation in the presence of hydrogen or hydrogen with a percentage of CO added) as a second stage. Therefore, this advantage of the present invention is an improvement on the known approaches to hydroprocessing in which raw bio-oil were utilized.

Utilizing the WGS reaction during full deoxygenation 16, 30, 40 may produce the same hydrocarbon production with lower hydrogen utilization as is experienced during partial deoxygenation 14, 26, 38 in the presence of pressurized syngas. Therefore, another novel aspect of the invention is the application of pressurized hydrogen with a percentage of CO added to promote the WGS reaction. The presence of CO when the full deoxygenating catalyst is either a biofunctional deoxygenating or WGS catalyst or a mixture of full deoxygenating catalyst and WGS catalyst produces hydrogen if water is present. The addition of CO to promote the WGS reaction allows the production of hydrogen from the reaction of CO and water. This in-situ production seeks to save volume and cost of hydrogen utilize. The percentage of CO utilized may be up to 50% with hydrogen comprising the remaining 50%; more or less CO may be applied depending on the nature of the intermediate boiler fuels 50, 54, 58 (basically boiler fuel water content must be sufficient to produce hydrogen in the presence of CO and water reacted with a WGS catalyst).

After the production of mixed hydrocarbons 150, 158, 166 by each of the three full deoxygenation steps 16, 30, 40 a distillation step 350 is shown in the process flow diagrams of FIG. 1, FIG. 2 and FIG. 3 will be applied. This step distills the mixed hydrocarbons 150, 158, 166 into their petroleum equivalents utilizing the usual boiling point temperature range to obtain these hydrocarbon cuts. The cuts produced from the hydrocarbon mixture will be the petroleum equivalents to gasoline 351, aviation fuel 352, and diesel 353. A small percentage of the hydrocarbon mixture may be heavy molecular weight hydrocarbons 354 that are vaporized above 350° C. These can be burned as fuel subjected to a full deoxygenation treatment to further crack the heavy molecules to those more suitable for transportation fuels.

Any reactor type may be utilized to perform the deoxygenation of the oxidized 1 and hyper-acidified 2 and liquefied product 101 products produced from oxidation 10 and acid anhydride 12 and liquefaction 11 treatments of bio-oil 100, biomass or coal 1000. These reactor types may include hydrotreaters, packed bed reactors, continuous stirred tank reactors or any other.

EXAMPLE 1

A raw bio-oil with approximately 30% water content was oxidized with a strong oxidizing agent. As shown in Table 1 the acid number increased from 90.28 to 161.0 mg KOH/g. Viscosity decreased by 45.16%; water content increased by about 11%. The HHV of the oxidized product decreased from 16.01 to 15.40 MJ/kg probably due to the water content increase. Density decreased from 1.22 to 1.14 g/ml and pH was reduced to 2.87 from 3.16. Oxygen content increased somewhat from 53.58 to 58.96. This resulted from both increased acid and water content.

The oxidized product was then partially deoxygenated in the presence of pressurized syngas (800 psi) and a Ni-based heterogeneous catalyst with an additive. Reaction temperature was 360° C. and time of reaction was 90 min. After cooling the partially deoxygenated oxidized product had an aqueous phase at the bottom of the vessel and an oil phase at the top. The aqueous fraction was separated the oil fraction. A portion of the oil fraction was maintained for testing as a boiler fuel product. The remainder of the oil fraction was subjected to full deoxygenation under hydrogen pressure of 1500 psi at a temperature 425° C. for 150 min. The resulting liquid contained both hydrocarbons as a top layer and a small percentage of an aqueous phase at the bottom.

TABLE 1

Comparison of raw bio-oil and oxidized product physical and chemical properties.

| Properties | Raw bio-oil | Oxidized product |
| --- | --- | --- |
| Density, g/mL | 1.22 | 1.14 |
| HHV, MJ/kg | 16.01 | 15.40 |
| Oxygen, wt % | 53.58 | 58.96 |
| Total acid number, mg KOH/g | 90.28 | 161 |
| pH | 3.16 | 2.87 |

TABLE 1-continued

Comparison of raw bio-oil and oxidized product physical and chemical properties.

| Properties | Raw bio-oil | Oxidized product |
| --- | --- | --- |
| Water content, vol % | 30.45 | 33.75 |
| Kinematic viscosity, 40° C., cSt | 12.09 | 6.63 |

The properties of the oxidized product, the resultant boiler fuel following partial deoxydation and the hydrocarbon mixture produced by full deoxygenation are given in Table 2. The HHV of the boiler fuel at 35.40 MJ/kg was more than double the 15.40 MJ/kg value of the oxidized product. Boiler fuel oxygen content was dramatically reduced from 58.96 to 14.0. Acid number was reduced from 161.0 to 51.6. pH was increased from 2.87 to 4.24. Water content of the boiler fuels was only 2.7 vol % compared to that of the oxidized product at 33.75 vol %. Density was reduced to 1.04 for boiler fuel compared to 1.14 for the oxidized product. Viscosity increased greatly from 6.63 to 28.25 cSt.

The properties of the hydrocarbon mixture were greatly improved above those of the boiler fuel. HHV was increased to 45.10, rivaling the value of most petroleum fuels. Oxygen content and acid value were zero. pH was on the basic side at 9.5. Water content was only 0.08. Density and viscosity were considerably lowered at 0.88 g/ml and 2.38 cSt, respectively.

TABLE 2

Comparison of oxidized product, boiler fuel and hydrocarbon mixture physical and chemical properties.

| Properties | Oxidized product | Boiler fuel | Hydrocarbon mixture |
| --- | --- | --- | --- |
| HHV, MJ/kg | 15.40 | 35.40 | 45.10 |
| Oxygen, wt % | 58.96 | 14 | 0 |
| Total acid number, mg KOH/g | 161 | 51.6 | 0 |
| pH | 2.87 | 4.24 | 9.5 |
| Water content, vol % | 33.75 | 2.7 | 0.08 |
| Density, g/ml | 1.14 | 1.04 | 0.88 |
| Kinematic viscosity, 40° C., cSt | 6.63 | 28.25 | 2.38 |

Figure 4:
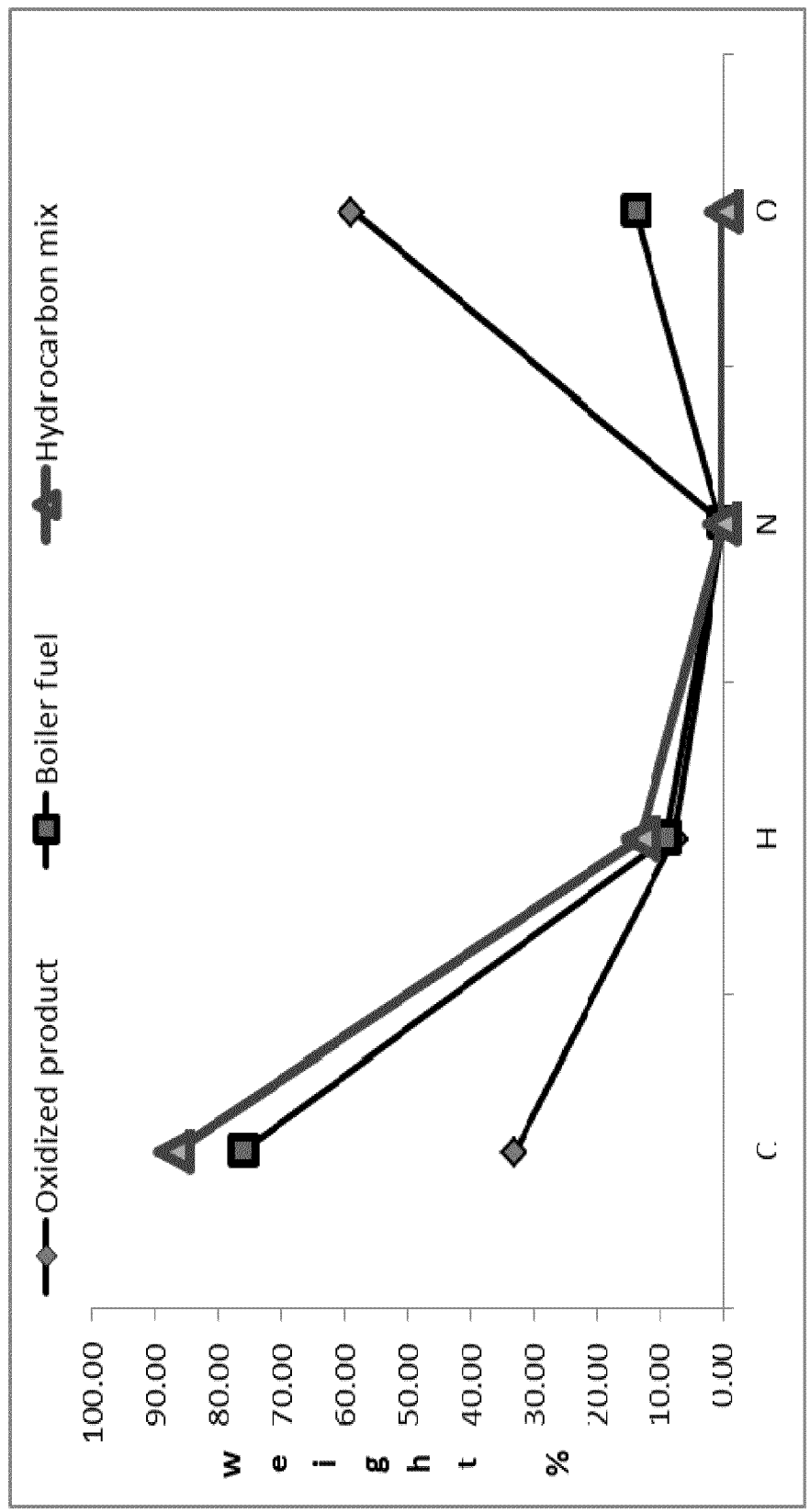
FIG. 4 illustrates a graph of the elemental composition weight percentages of the oxidized product, boiler fuel and hydrocarbon mixture.

FIG. 4 shows the elemental composition weight percentages of the oxidized product, boiler fuel and hydrocarbon mixture. The carbon content of the boiler fuel of 76.4 wt % increased from that of the oxidized product at 33.12 wt %. Carbon content of the hydrocarbon mixture was 87.06. The oxygen content of the oxidized product decreased from 58.96 wt % to 14.0 wt % for boiler fuel to zero for the hydrocarbon mixture.

A Detailed Hydrocarbon Analysis (DHA) was performed by the ASTM D6730-01 or often referred as PIANO (paraffins, iso-paraffins, aromatics, naphthenes and olefins) method to classify the hydrocarbons present in the hydrocarbon mixture. The results of the DHA are given in Table 3. These results showed that the hydrocarbon mixture contains n-paraffins of 21.33 mass %, iso-paraffins of 35.9 mass %, olefins of 13.65 mass %, naphthenes of 20.55 mass %, aromatics of 8.56 mass % and oxygenated compounds of 0.005 mass % as shown in Table 3.

TABLE 3

Hydrocarbon types and their mass % present in hydrocarbon mixture results analyzed by Detailed Hydrocarbon Analysis by ASTM D6730-01 method.

| Hydrocarbon type | Total (mass %) |
|---|---|
| Paraffins | 21.33 |
| I-Paraffins | 35.9 |
| Olefins | 13.65 |
| Naphthenes | 20.55 |
| Aromatics | 8.56 |
| Oxygenated | 0.005 |

Figure 5:
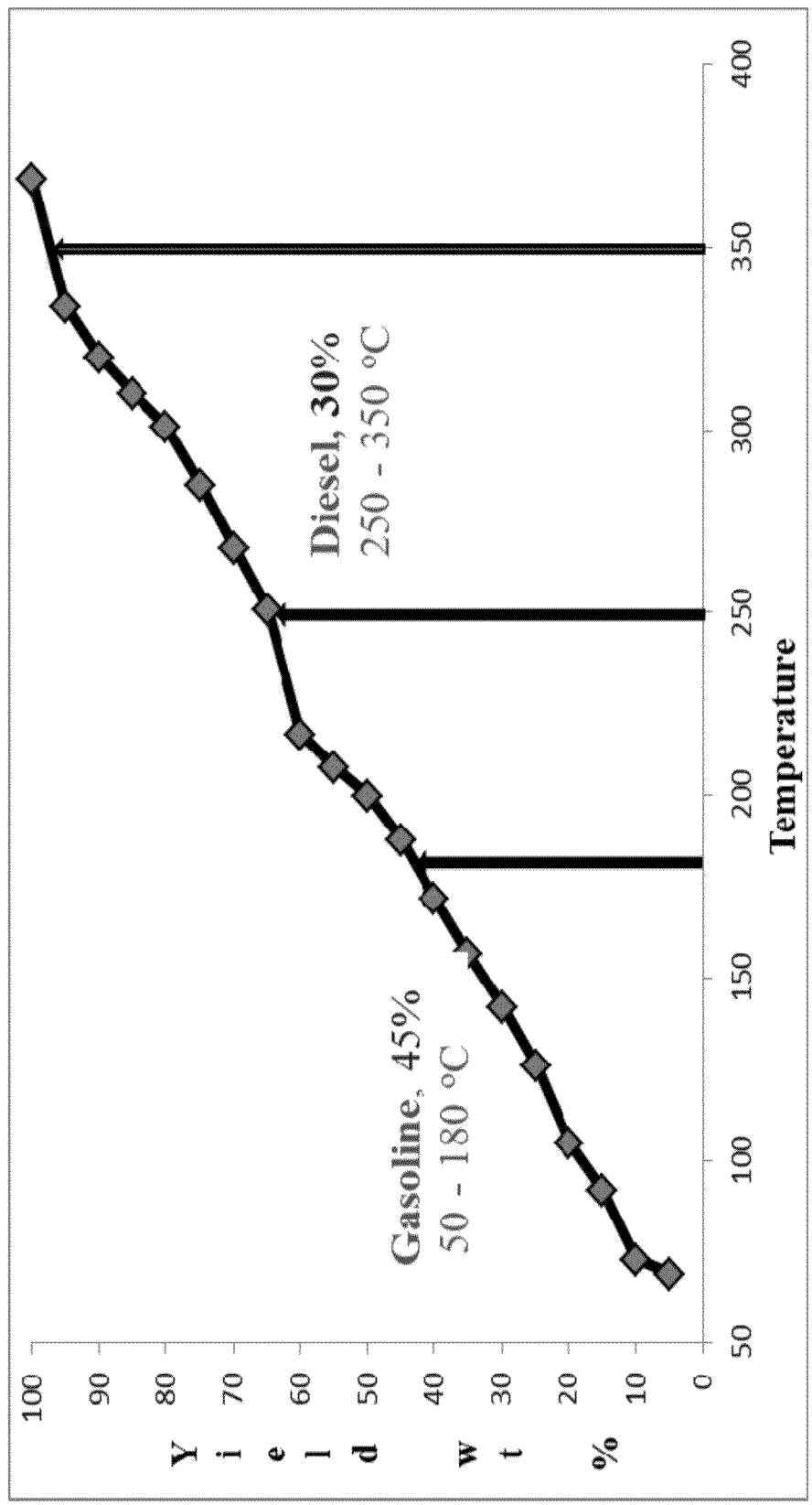
FIG. 5 illustrates a graph of the petroleum fuel equivalent based on vaporization temperature.

Simulated distillation of the hydrocarbon mixture results are shown in FIG. 5. FIG. 5 shows the petroleum fuel equivalent based on vaporization temperature. Simulated distillation of hydrocarbon mixture was performed by the ASTM D2887 method for boiling range distribution of petroleum fractions by gas chromatography. These boiling temperatures are given below the named petroleum equivalents in the figure. These petroleum equivalents were of the molecular weights of gasoline (45%), jet fuel (20%) and diesel (30%). Now shown in FIG. 5 is the 5% of heavy fuel produced at temperatures above 350° C.

Gas samples collected before and after the catalytic partial deoxygenation of the oxidized product under pressurized syngas were analyzed using micro-gas chromatography are shown in Table 4. The syngas applied in the partial deoxygenation process comprised of approximately hydrogen 18%, nitrogen 47%, methane 2%, carbon monoxide 22% and carbon dioxide 11%. Once the reaction is completed the unreacted syngas sample is comprised of approximately hydrogen 1.79%, nitrogen 38.63%, methane 2.35%, carbon monoxide 1.02%, carbon dioxide 38.99%, oxygen 0.88% and ethane 0.11%. As shown in Table 4 the carbon monoxide was consumed by 95.4% and carbon dioxide increased by 254.5% during the partial deoxygenation reaction. Clearly, the WGS reaction has taken place during the catalytic partial deoxygenation as shown in Reaction 1 below. Reaction 1 shows the WGS reaction of carbon monoxide by reacting with water produces hydrogen and carbon dioxide.

$$CO + H_2O \rightarrow H_2 + CO_2 \quad \text{Reaction 1.}$$

TABLE 4

Micro-gas chromatography analysis of gas samples collected before and after the partial deoxygenation of the oxidized product under pressurized syngas.

| Sample | $H_2$ % | $O_2$ % | $N_2$ % | $CH_4$ % | $CO$ % | $CO_2$ % | $C_2H_5$ % | Total |
|---|---|---|---|---|---|---|---|---|
| Syngas | 18.00 | 0.00 | 47.00 | 2.00 | 22.00 | 11.00 | 0.00 | 100.00 |
| Partial deoxygenation | 1.79 | 0.88 | 38.63 | 2.35 | 1.02 | 38.99 | 0.11 | 83.78 |

The chemical compositions of the hydrocarbon mixture produced by the invention are shown in Table 5. Hydrocarbon mixture compounds were analyzed by gas chromatography-mass spectroscopy (GC-MS) by the ASTM D6420 test method. The GC-MS analysis as shown in Table 5 reduced acids, phenols, aldehyde and ketones by approximately 100% by converting them to hydrocarbons. As shown in Table 5, the majority of compounds present in the hydrocarbon mixture are comprised of approximately 99% of hydrocarbons (naphthenes, paraffins, iso-paraffins, olefins and aromatics).

TABLE 5

Chemical composition of the hydrocarbon mixture analyzed by gas chromatography-mass spectroscopy (GC-MS).

| Peak | Compound name | area % |
|---|---|---|
| 1 | 1-Butene | 2.637 |
| 2 | Cyclopropane,1,1-dimethyl | 2.047 |
| 3 | Heptane | 1.025 |
| 4 | Cyclohexane,methyl | 6.694 |
| 5 | 1-Hexene,4-methyl | 1.624 |
| 6 | Cyclohexane,1,3-dimethyl,cis | 1.861 |
| 7 | Cyclopentane,1-ethyl-3-methyl | 2.413 |
| 8 | Cyclohexane,1,2-dimethyl,trans | 1.604 |
| 9 | Cyclohexane,1,3-dimethyl,trans | 0.988 |
| 10 | Cyclohexane,1,2-dimethyl,cis | 1.673 |
| 11 | Cyclohexane,ethyl | 4.037 |
| 12 | Cyclopentane,butyl | 1.332 |
| 13 | Cyclohexane,1-ethyl-4-methyl,cis | 4.232 |
| 16 | Cyclohexaneethanol | 1.227 |
| 17 | Cyclohexane,propyl | 5.433 |
| 18 | 2-Hexene,4-ethyl-2,3-dimethyl | 0.859 |
| 19 | Bicyclo[3.3.1]nonane | 1.233 |
| 20 | Cyclohexane,1-methyl-2-propyl | 1.719 |
| 21 | Cyclohexane,1,3-dimethyl,trans | 0.95 |
| 22 | 1,2-Dipropylcyclopropene | 1.822 |
| 23 | Cyclohexane,butyl | 1.187 |
| 24 | Cyclohexene,1-butyl | 1.7 |
| 25 | Naphtalene,decahydro-,trans | 0.865 |
| 26 | Cyclopentane,1,1'-ethylidenebis- | 1.45 |
| 27 | Cyclohexane,1-ethyl-2-propyl- | 1.486 |
| 28 | 1,4-Heptadiene,3-methyl- | 1.468 |
| 29 | Cyclohexene,1-butyl | 0.848 |
| 30 | Naphtalene,decahydro-2-methyl | 0.959 |
| 31 | 1-Phenyl-1-butene | 0.88 |
| 32 | Benzene,(1-methyl-1-butenyl) | 0.951 |
| 33 | Benzene,(2-methyl-1-butenyl) | 1.11 |
| 34 | Cyclohexene,1,6-dimethyl | 0.878 |
| 35 | Naphthalene,decahydro-2,6-dimethyl | 1.365 |
| 36 | Naphthalene,1,2,3,4-tetrahydro-1 Benzene,1-ethenyl-4methyl | 1.0 |
| 37 | Benzene,(2,2-dimethyl-1methylene) | 0.965 |
| 38 | 1,13-Tetradecadiene | 1.377 |
| 39 | 1.11-Dodecadiene | 0.951 |
| 40 | Naphthalene,1,2,3,4-tetrahydro-1, 1H-Indene,2,3-dihydro-1,1,5-trimethyl | 2.625 |
| 41 | Naphthalene,1,2,3,4-tetrahydro-1, 1H-Indene,2,3-dihydro-1,1,5,6-tetramethyl | 3.595 |
| 42 | Pentadecane | 2.98 |
| 43 | 1-Phenylbicyclo(4.1.0)heptane | 0.909 |
| 44 | Benzene,[(tetramethylcyclopropyl) | 4.943 |
| 45 | Benznene,1,3-bis(1-methylethenyl) | 1.321 |
| 46 | Heptadecane | 9.345 |
| 47 | 9-Methyl-S-octahydroanthracene | 3.957 |
| 48 | 1H-Indene,2,3-dihydro-1,1-dimethyl | 3.438 |
| 49 | Naphthalene,1,2,3,4-tetrahydro-1 | 1.576 |
| 50 | Benz[a]anthracene,7-methyl | 0.335 |
| | Total | 100 |

EXAMPLE 2

In an example of the application of this liquefaction process, a liquefaction treatment using 5-10 wt % (dry weight biomass basis) of KOH as catalyst has been performed. The aqueous alcohol solvent is comprised of 1:1 water and alcohol. The ratio of solvent to dry weight DDGS was 2:1. Accordingly, a 300 g quantity of material plus aqueous alcohol solvent to be liquefied would contain 100 g DDGS, 100 g water and 100 g of alcohol. The mixed ingredients were added to an autoclave and thermally treated for 30 min without pressure or gas addition. After attaining a reaction temperature in the range of 350-400° C. the reaction was completed and the liquefied product removed. No pressure was utilized to assist in the reaction but pressure may be applied as some practitioners have done.

In an example of the application of this catalytic deoxygenation process, liquid products produced with the liquefaction process and 5 wt % of a heterogeneous catalyst were subjected to a full deoxygenation step at a temperature of 200-500° C. with 500-2500 psi hydrogen pressurized conditions for 120 min. The deoxygenated products were clearly separated into two layers comprised of a bottom aqueous fraction with the hydrocarbon mixture at the top of the vessel on the water. The hydrocarbon mixture produced from this process had an HHV of 42.5 MJ/kg which is just slightly below that of refined diesel with an HHV value of 45.7 MJ/kg. This high-energy fuel can be utilized as a boiler fuel directly or applied second full deoxygenation step to a more pure hydrocarbon mixture for use as transportation fuel.

Table 6 shows some of the properties of DDGS, liquefied DDGS product and the hydrocarbon mixture resulting from the full deoxygenation treatment. The solid DDGS has a HHV of 19.15 MJ/kg and moisture content of 7.8 wt %. The elemental composition of DDGS is carbon 44.38 wt %, hydrogen 7.16 wt %, nitrogen 5.3 wt % and oxygen 43.01 wt %. The liquefied DDGS product HHV increased to 38 MJ/kg, a percentage increase of 98.4%. The elemental content of liquefied DDGS product compared to DDGS; carbon and hydrogen contents increased to 77.17 and 10.61 wt % from 44.38 wt %, 7.16 wt %, percentage increases of 74.0 and 48.0, respectively. The nitrogen and oxygen contents decreased to 4.32 and 8.37 wt % from 5.3 wt % and 43.01 wt %, respectively. The full deoxygenation treatment resulted in a large decrease in oxygen content of 514.0%. Table 1 also shows the liquefied DDGS product total acid value was 12.5 mg KOH/g, rather low for an intermediate liquid product of biomass. Water content of the liquid DDGS product was 5.1%; pH was 5.18 indicating slight acidity for the liquid bio-oil intermediate; viscosity 42.5 cSt.

The hydrocarbon mix produced from liquefied DDGS product properties are also provided in Table 6. Hydrocarbon mixture properties were greatly improved by the full deoxygenation applied. HHV increased to 42.5 MJ/kg just slightly lower than the values for petroleum transportation fuels. pH was increased by 48% to 10.6, which made it slightly basic compared to fuels from fast pyrolysis oils that are acidic. This eliminates any concern for acid corrosion for this hydrocarbon mixture is always a concern with converted fast pyrolysis bio-oils. The total acid value decreased to zero from 12.5 mg KOH/g. Water content was reduced from 5.1 to 1.79 vol %. Viscosity was reduced greatly to 3.7 from 42.5 cSt. This value is very close to the value for petroleum transportation fuels. The elemental composition of the liquefied DDGS product as compared to the hydrocarbon mixture showed that carbon content increased from 77.17 to 82.74 and that hydrogen increased from 10.61 to 11.38 wt %, respectively. The nitrogen content decreased to 3.85 from 4.32 and oxygen was reduced to 1.56 from 8.37 wt %.

TABLE 6

Physical and chemical properties of untreated DDGS, the liquefied DDGS product and the hydrocarbon mixture produced by catalytic deoxygenation.

| Properties | DDGS | Liquefied DDGS product | Hydrocarbon mix |
|---|---|---|---|
| HHV, MJ/kg | 19.15 | 38 | 42.5 |
| O, wt % | 43.01 | 8.37 | 1.56 |
| Total acid number, mg KOH/g | — | 12.5 | 0 |
| pH | — | 5.8 | 10.6 |
| Water content, vol % | 7.8 | 5.1 | 1.79 |
| Kinematic viscosity, 40° C., cSt | — | 42.5 | 3.7 |
| C % | 44.38 | 77.17 | 82.74 |
| H % | 7.16 | 10.61 | 11.38 |
| N % | 5.3 | 4.32 | 3.85 |
| O % | 43.01 | 8.37 | 1.56 |

Overall, this application describes novel methods to produce boiler fuels from any bio-oil type produced from any material or by any method via oxidation and acid anhydride treatments of said bio-oil followed by partial catalytic deoxygenation in the presence of pressurized syngas or hydrogen. The oxidation and acid anhydride pretreatments may be applied singly or together in any order. The catalysts utilized for the pressurized syngas partial deoxygenation may be a bifunctional deoxygenating/water gas shift catalyst or a mixture of deoxygenating and water gas shift catalysts. The catalyst utilized for partial deoxygenation in the presence pressurized hydrogen will be a deoxygenating catalyst or a mixture of deoxygenating catalysts. Esterification or olefination/esterification may be performed simultaneously with the catalytic deoxygenation step by addition of alcohol to achieve esterification or by the addition of olefins and alcohol to achieve olefination/esterification. Partial deoxygenation, esterification simultaneous with partial deoxygenation or simultaneous esterification/olefination with partial deoxygenation each result in the production of a type of boiler fuel with increased hydrocarbon content producing a fuel with HHV greater than 30 MJ/kg. Another route to a boiler fuel is liquefaction of any type of biomass or coal followed by partial deoxygenation. Boiler fuels produced by these methods may be used directly or further upgraded to transportation fuels. Production of transportation fuels requires the application of a full deoxygenation step that may be performed under 100% hydrogen pressure or under pressure with a syngas that contains up to 50% CO in addition to the hydrogen. Presence of the correct proportion of CO can cause a water gas shift reaction that produces additional hydrogen. For production of transportation fuels, low volatility petroleum products or fats may be added to the to the boiler fuel following partial deoxygenation, simultaneous esterification partial deoxygenation or simultaneous olefination/esterification partial deoxygenation and prior to the full deoxygenation step. Therefore, the invention produces multiple types of boiler fuels that may be combusted for heating or the boiler fuels may be converted to a hydrocarbon mixture. The hydrocarbon mixture will be distilled to the petroleum equivalent molecular weights of gasoline, aviation fuel, diesel fuel or others. Blending of these petroleum equivalents will allow production of ASTM quality transportation fuels.

What is claimed is:

1. A method for producing an improved fuel product, comprising the steps of:
- obtaining a bio-oil generated from processing biomass;
- performing a first phase of pretreatment on the bio-oil, wherein the first phase includes at least an acid anhydride step configured to convert water to carboxylic acids thus increasing product acidity and reducing water content in the bio-oil, and wherein an output of the first phase of pretreatment is a hyper-acidified intermediate product;
- implementing a second phase of treatment on the hyper-acidified intermediate product, wherein the second phase of treatment includes one or more steps selected from the group of:
  - a. a partial deoxygenation step,
  - b. a full deoxygenation step
  - c. a decarboxylation step,
  - d. an esterification step,
  - e. an olefination/esterification step, and
  - f. a hydroprocessing step;

which are configured to improve fuel yield and energy density in a final fuel product.

2. The method of claim 1, wherein the first phase of pretreatment includes both an oxidation step configured to increase carboxylic acid content and the acid anhydride step configured to reduce water content in the bio-oil.

3. The method of claim 1, wherein the partial deoxygenation step includes using syngas to at least partially deoxygenate the hyper-acidified intermediate product.

4. The method of claim 1, wherein the decarboxylation step includes using syngas in a pressure environment of between 500 psi and 2000 psi and a temperature environment generally between 200° C. and 400° C.

5. The method of claim 1, wherein after the first phase, but before the second phase, the method comprises a step of adding free fatty acids to the hyper-acidified intermediate product, and, in the second phase, at least an esterification step is implemented to produce the final fuel product containing a high percentage of esters.

6. The method of claim 1, wherein after the first phase, but before the second phase, the method comprises a step of adding free fatty acids to the hyper-acidified intermediate product, and, in the second phase, at least a decarboxylation step or deoxygenation step is implemented to produce a hydrocarbon mixture as a precursor fuel product.

7. The method of claim 1, wherein the hydroprocessing step includes a two-stage process by which the hyper-acidified intermediate product is hydrotreated at a temperature between 200 and 500° C. with hydrogen gas pressure between 200 and 2500 psi in a first stage and is hydrocracked in a second stage at a temperature between 200 and 500° C. with hydrogen gas pressure between 500 and 2500 psi.

8. The method of claim 7, wherein the hydroprocessing step includes utilizing at least one catalyst selected from the following group:
- a. nickel (Ni),
- b. chromium (Cr),
- c. molybdenum (Mo),
- d. tungsten (W),
- e. barium (Ba),
- f. cobalt (Co),
- g. rhodium (Rh),
- h. potassium (K),
- i. iridium (Ir),
- j. ruthenium (Ru),
- k. rhenium (Re),
- l. platinum (Pt),
- m. palladium (Pd),
- n. iron (Fe),
- o. copper (Cu),
- p. zinc (Zn),
- q. cerium (Ce),
- r. manganese (Mn),
- s. scandium (Sc),
- t. zirconium (Zr), or
- u. phosphorous (P), each of which may be supported on all types of alumina, silica, silica-alumina, titania, zirconia and all types of zeolites.

9. The method of claim 1, wherein an output from the second phase of treatment is the final fuel product as a drop-in fuel.

10. The method of claim 1, wherein an output from the second phase of treatment is a precursor fuel product and the method of claim 1 further comprises executing a third phase of post-treatment on the precursor fuel product, wherein the third phase includes one or more steps selected from the group of distilling the precursor fuel product or blending the precursor fuel product with another substance, and wherein an output of the third phase of post-treatment is a final fuel product.

11. The method of claim 1, wherein at least one of the steps in the second phase includes exposing the hyper-acidified intermediate product to a catalyst.

12. The method of claim 11 comprising an additional step of inserting an alcohol with a carbon number of c1-c30 or any mixture of alcohols with carbon numbers of c1-c30 into the hyper-acidified intermediate product.

13. The method of claim 11, further comprising the step of pressurizing the catalyst and the hyper-acidified intermediate product with a pressurized gas, wherein the pressurized gas is selected from the following: hydrogen gas, syngas, natural gas, carbon monoxide, methane, or any combination of hydrogen gas, carbon monoxide, methane, syngas, and natural gas.

14. The method of claim 13, wherein the catalyst and hyper-acidified intermediate product are pressurized between 200 and 3000 psi at a temperature between 200 and 500° C.

15. The method of claim 11, wherein the catalyst is one or more selected from the following:
- a. a metal carbonate mixture supported by $SiO_2$—$Al_2O_3$,
- b. activated carbon,
- c. $Al_2(SiO3)_3$,
- d. $Al_2O_3$,
- e. $SiO_2$,
- f. $TiO_2$,
- g. $CeO_2$,
- h. $K_2CO_3$,
- i. $Na_2CO_3$,
- j. $NiCO_3$,
- k. Cu(I)O,
- l. Cu(II)O,
- m. CaO,
- n. ZnO,
- o. $Ni_2P$,
- p. $Mo_2P$,
- q. $Mo_2S$,
- r. $Fe_2O_3$,
- s. NiO,
- t. KOH,
- u. $ZrO_2$,
- v. zeolites,
- w. hydrotalcite, or
- x. HZSM5.

16. The method of claim 11, wherein the catalyst is one or more selected from mixed metals supported on:
 a. $SiO_2$—$Al_2O_3$,
 b. $SiO_2$,
 c. $ZrO_2$,
 d. $TiO_2$,
 e. $CeO_2$,
 f. $Cu(II)O$,
 g. activated carbon,
 h. $Al_2(SiO3)_3$,
 i. $Al_2O_3$, or
 j. zeolites.

17. The method of claim 11, wherein the catalyst is one or more selected from metals supported on:
 a. $SiO_2$—$Al_2O_3$,
 b. $SiO_2$,
 c. $Al_2O_3$—$CuO$—$K_2CO_3$
 d. activated carbon,
 e. $Al_2(SiO3)_3$,
 f. $Al_2O_3$, or
 g. zeolites,
each of which are combined with metal carbonates.

18. The method of claim 11, wherein the catalyst is one or more selected from:
 a. metal oxide combined with a metal carbonate,
 b. metal carbonate mixture supported on metal hydroxides,
 c. metal sulfides combined with metal carbonates, or
 d. metal supported by zeolites combined with metal oxides and metal carbonates,
 e. Metal supported by $Al_2O_3$ or $Al_2O_3$—$SiO_2$ combined with metal oxides and metal carbonates.

\* \* \* \* \*